Feb. 20, 1934.  A. H. WHITE ET AL  1,948,085
PRODUCER GAS PROCESS USING SODIUM CARBONATE
Filed March 26, 1931
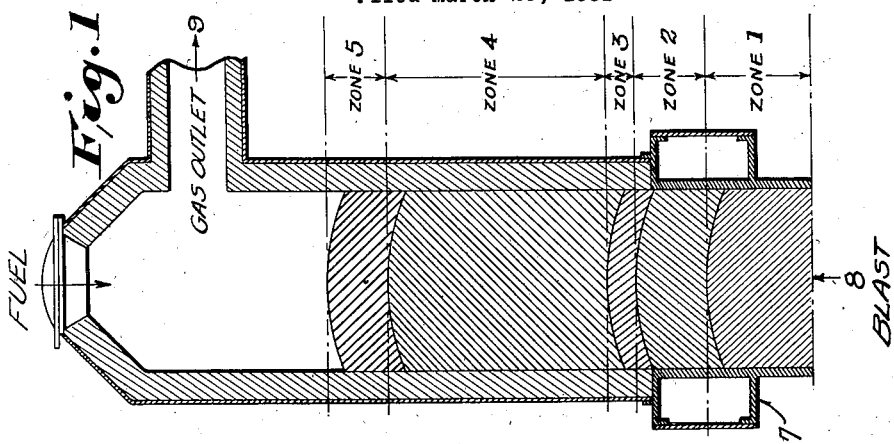
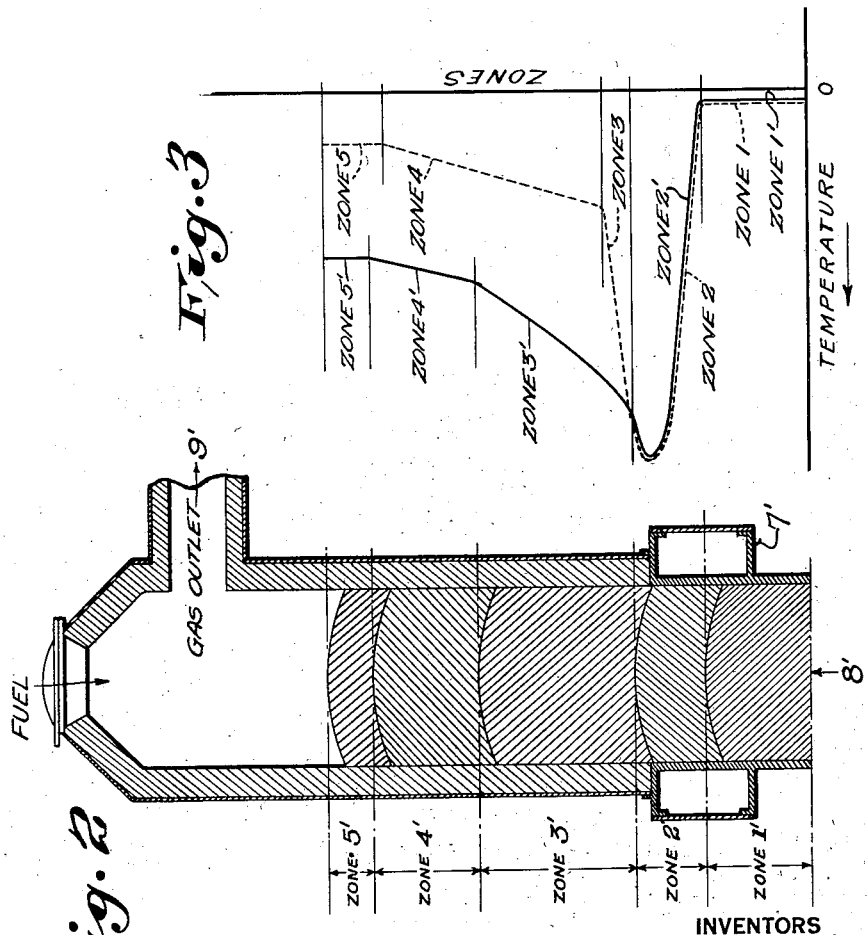
INVENTORS
Alfred H White
BY David A Foot
Louis Pearl
ATTORNEY Patented Feb. 20, 1934

1,948,085

UNITED STATES PATENT OFFICE 1,948,085

PRODUCER GAS PROCESS USING SODIUM CARBONATE

Alfred H. White, Ann Arbor, Mich., and David A. Fox, Milwaukee, Wis.

Application March 26, 1931. Serial No. 525,437

2 Claims. (Cl. 48—203)

This invention relates to the manufacture of fuel gas from carbonaceous materials through the interaction of air and steam with the carbonaceous material at elevated temperatures to produce a type of gas which is frequently called producer gas. The usual procedure in the manufacture of producer gas consists in blowing air, often with some steam, through an incandescent bed of coal or coke of appreciable depth. The oxygen of the air passing upward through the fuel bed reacts with the carbon to form carbon dioxide according to Equation 1:

$$C + O_2 = CO_2 \qquad (1)$$

The carbon dioxide then reacts in varying degree with more carbon to form carbon monoxide according to Equation 2:

$$CO_2 + C = 2CO \qquad (2)$$

When steam is used in conjunction with air it reacts with incandescent carbon forming carbon monoxide, carbon dioxide and hydrogen. The reactions are frequently formulated as in Equations 3 and 4:

$$C + H_2O = CO + H_2 \qquad (3)$$

$$CO + H_2O = CO_2 + H_2 \qquad (4)$$

It is desirable that the gas leaving the fuel bed be as rich as possible or, in other words, contain as large proportions of carbon monoxide and hydrogen and as small amounts of carbon dioxide and steam as is feasible. A high percentage of carbon monoxide and hydrogen is favored by high temperatures and temperatures in commercial producers may be run as high as 1400 degrees C. in the fuel bed in an effort to increase the richness of the gas. This high temperature increases the rate of reaction and also gives a richer gas, but is nevertheless disadvantageous from an operating standpoint. There is greater difficulty with the formation of clinkers, the life of the equipment is shortened and more frequent repairs are necessitated if the operation is carried on at high temperatures.

To escape the limitation of low temperature operation, producers are at times operated at higher temperature. These producers are known as the slagging type and they are operated at temperatures high enough to completely melt the ash with the aid of a small amount of added flux. Gains in capacity and richness of gas are obtained by such operation. However, the difficulties encountered in tapping the melted ash and in maintaining the lining of the producer largely offset the advantages gained except where the only fuel available is very low grade coal with high ash content.

Another means of improving common producer operation is to employ oxygen or air containing more than the normal oxygen content. This method of operation adds to the richness of the gas produced due to the elimination of a good part of the inert diluent nitrogen. The separation of oxygen from the air, however, is difficult and laborious and separated oxygen is not at present available in sufficient abundance to render this process generally practical.

Other means of improving the operation of the gas producer are known. Among the known means is the fact that certain substances added to carbon cause the carbon, when heated to lower temperatures, to react with carbon dioxide and/or steam at a rate similar to carbon heated to higher temperatures. Prior to this invention it was believed that these added substances performed a purely catalytic function. Attempts to employ such addition materials for useful purposes have, however, been unsuccessful due to a lack of appreciation of the actual part played by these substances.

In contrast to the failure of others to facilitate the manufacture of producer gas and to improve the quality or richness thereof without entailing prohibitive difficulties, this invention provides a new means for increasing the capacity of producers and at the same time provides means for rendering an improvement in the quality of the gas produced and in the heat economy of the entire operation.

We have discovered that sodium carbonate when added to carbon increases the reactivity of the same not by a catalytic effect as formerly believed but by providing a transfer agent for a set of cyclic reactions. A full understanding of this fact has made possible the discovery of conditions, modes of operating and forms of apparatus which have not been known or used by others before and which make possible great improvements in the manufacture of producer gas.

The discovery of the part played by sodium carbonate in rendering carbon more reactive is the result of long and careful experimentation. It has long been known that when carbon and sodium carbonate are heated in the absence of air to a bright red heat they react to produce a gaseous product containing elemental sodium vapor. By our experimentation the gaseous product has been found to be almost entirely composed of carbon monoxide gas and sodium vapor, in the ratio of three molecules to two atoms, respectively. We have discovered that this gaseous product is evolved at increasing pressures as the temperature of the reacting mass is increased approximately according to the following table:

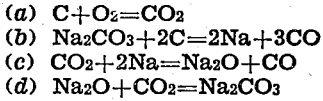

| Temperature | Vapor pressure in millimeters of mercury |
|---|---|
| 800° C. | 10 |
| 850° C. | 53 |
| 900° C. | 181 |
| 950° C. | 432 |
| 1000° C. | 718 |
| 1050° C. | 1020 |

We believe from these facts that the function of sodium carbonate in increasing the reactivity of carbon cannot be a purely catalytic one and that sodium carbonate when added to carbon and heated in a blast of air and/or steam provides a transfer agent for a set of cyclic reactions. This transfer agent is sodium either in an elemental or combined state. As an example of the mechanism of the exchange reactions the following equations might be written for a sodium treated fuel bed in an air-blown producer:

(a) $C+O_2=CO_2$
(b) $Na_2CO_3+2C=2Na+3CO$
(c) $CO_2+2Na=Na_2O+CO$
(d) $Na_2O+CO_2=Na_2CO_3$

The above formulation is suggested only as an example of a possible manner in which the cyclic exchange reaction can take place. If the formulation is inaccurate and if the course of the reaction in fact is somewhat different, we do not wish to be literally bound to the same for it is only intended to express a broad or general conception.

In explaining the principle of this invention reference is had to the diagrams displayed.

In Fig. 1 is shown a longitudinal section of the fuel bed and producer operating according to this invention.

In Fig. 2 is shown a longitudinal section of an ordinary producer operating in the ordinary manner.

The fuel beds in the figures are divided by arbitrarily placed lines into a number of vertically disposed zones numbered 1, 2, 3, 4, 5, 1', 2', 3', 4' and 5' in which similar numbers represent similar zones in the two figures.

Relative temperatures throughout the zones in Figures 1 and 2 are represented by the graphs in Fig. 3 which are drawn to be dimensionally coextensive with respect to the height of Figures 1 and 2. The broken line represents temperatures in Figure 1 and the full line represents temperatures in Figure 2. Air or air and steam are introduced as indicated at 8 and 8' and the resulting gas removed as indicated at 9 and 9'.

In Figure 1, zone 1 represents the layer of ash which accumulates as the operation of the producer proceeds. The thickness of this zone is maintained approximately uniform by continuous or intermittent removal of ash. In Figure 2 zone 1' is similar.

In Figures 1 and 2 zones 2 and 2' represent the main combustion zones and it is here that the reaction $C+O_2=CO_2$ takes place. This reaction proceeds rapidly and evolves much heat, part of which is carried upward into the zones above and part of which is dissipated or, if preferred, absorbed by water-jacket 7 or 7'. It is the heat generated in zones 2 and 2' and carried upward which causes the endothermic combustible-gas forming reactions to proceed in the zones above.

The temperature in zones 2 and 2' is high as compared with the temperatures in the rest of the gas producer. In this invention, in contrast to other methods of using sodium-treated fuel, the temperatures in zone 2 can be much the same as zone 2' of an ordinary producer, as is shown in Figure 3 where the broken and the solid line follow each other very closely through zones 2 and 2'.

In zone 2 of a producer operating according to our invention very little or no sodium contained. The reaction $Na_2CO_3+2C=2Na+3CO$ proceeds with great rapidity at the temperature prevailing in zone 2 and practically all of the sodium is vaporized and carried into the zones above. The vaporization of sodium is one of the important phases of this invention for the same makes possible operation without undue formation of clinkers and without appreciable loss of sodium.

One method of operating according to the invention is to adjust the quantity of air and steam introduced so that the maximum temperatures in zone 2 are just short of the normal softening temperature of the ash in the fuel used. This method of operation is preferable in most cases, but at times we prefer to operate with temperatures in zone 2 only high enough to prevent passage of any appreciable amount of sodium into the ash.

As shown in Figure 1, zone 3 of a producer operating according to this invention is carefully maintained in a state which we believe has never before been known or used by others. By blasting a sodium-treated producer to a degree which will maintain the proper temperature in zone 2, sodium becomes concentrated in zone 3 to such an extent that $CO_2$ and $H_2O$ are reduced almost immediately. This reduction of $CO_2$ and $H_2O$ is accomplished at considerable thermal expense and the temperature through zone 3 drops very abruptly, as indicated by the broken line in the graph in Figure 3.

This condition, which we believe has never before been known or used by others, produces a novel and very useful result. The great abruptness with which the temperature falls in zone 3 is indicative of the large amount of heat there absorbed as well as of the great reactivity of the fuel in this zone. Zone 3 in fact is so active that the entire reducing function of the producer is accomplished in a zone of comparatively very little depth. Every part of this very shallow, relatively cool zone 3 is in such a short range of the heat-supplying zone 2 that radiation and conduction come heavily into play in greatly augmenting the rate of supply of heat to the reducing zone, greatly increasing the capacity of the same.

Not only does this increased rate of heat transfer increase the capacity of the reduction zone but it also increases the efficiency of the same as well. The heat is supplied at a considerably higher temperature avoiding the losses occasioned in ordinary producer operation which occur when heat conveyed to the extreme upper layer of the reduction zone is rejected due to the temperature having fallen below a critical value below which no reduction takes place. Also due to the small dimensional extent of the high temperature zones 2 and 3, far less heat is rejected by radiation from the shell of the machine of this invention.

The high rate at which heat is extracted from the combustion zone 2 makes possible large gains in capacity of this zone, because the blasting may be forced far beyond the rate for an ordinary producer without exceeding the maximum temperature which the particular method of operating may require.

In contrast, zone 3' Figure 2 is very broad and the temperature drop therethrough is smaller and more gradual. This condition, we believe, is typical of all ordinary producers operating in the ordinary manner.

This indicates a sluggish rate of reduction of $CO_2$ and $H_2O$ and a smaller amount of heat usefully employed. The resulting gas is of lower heating value and carries much non-usable sensible heat.

Another advantage of this invention is that a deeper preheating zone, zone 4 Figure 2, can be used. In ordinary producer operation back pressure and cost of blasting making the use of a deeper preheating zone prohibitive, but in this invention the extreme shallowness of the reduction zone makes this possible. In this invention the deep preheating zone 4 performs a double function. It reduces sensible heat losses and thereby increases efficiency and also serves to prevent losses of sodium by condensation thereof and by trapping of flying particles of sodium oxide and carbonate.

Zones 5 and 5' are the preliminary heating zones or drying and coking zones and these zones are the same in our invention and in ordinary producer operation except under certain conditions, to-wit: If the sodium carbonate, which is added to the fuel to make up for inevitable small losses, be added by impregnating the fuel with a sodium carbonate solution and the fuel has a higher moisture content, zone 5 will be of somewhat greater depth than zone 5'.

In describing this invention it has been shown that practically no sodium is lost in the ash, due to the reactions taking place in zone 2 and also that zones 4 and 5 prevent the loss of sodium in the gas. The sodium carbonate which is filtered out in zones 4 and 5 is carried down again with the fuel charge to the reaction zone as fuel is consumed and thus is continually being regenerated and recycled. The amount of sodium carbonate which must be added is very small and will vary widely with the care with which the operation is conducted.

If the gas is scrubbed, the loss of sodium can be reduced to practically nothing if the scrubbing liquor can be cooled in a cooling tower and returned to the scrubber. A liquor containing sodium carbonate, bicarbonate, etc., which is valuable in reducing the sulphur content of the gas, and which can be used for impregnating the fuel is created.

The producer gas made according to this invention is higher in heating value than gas made in the ordinary manner. Ordinary producer gas contains at times twelve per cent. or more of carbon dioxide which not only represents material which could be converted into combustible carbon monoxide, but also material which dilutes the gas and renders it lower in heating value. In a producer operating according to our invention the rate of reduction of carbon dioxide is so rapid that very little carbon dioxide is contained in the gas and a gain in heating value results. The amount of steam passing through the old producer in ordinary operation is considerable. This undecomposed steam represents a loss in the overall efficiency of the producer. In a producer operating according to this invention greater amounts of steam are reduced and a higher efficiency results. The distribution of sodium compounds, temperature gradients and transport mechanisms in the fuel bed are such that a gas richer in carbon monoxide and hydrogen than ordinary chemical equilibrium will permit may be produced and this may also be an important reason for the improvement in results which this invention obtains.

We have formed a conception of the molecular mechanism involved in this invention which is of great help in correlating the ideas thereof and we offer it only as such an aid, and if it be inaccurate the value, novelty and usefulness of the invention will remain. The explanation follows:

The reducing reactions (2) $CO_2+C=2CO$ and (3) $H_2O+C=CO+H_2$ both must take place by diffusion of gases because carbon even at a red heat is a solid—and for practical purposes a solid with no vapor pressure—while the other reacting substances are gases. The diffusion in the case of these reactions is of an unusual kind because in either case two molecules of gas are created each time one molecule of carbon dioxide or steam reaches the carbon and reacts. The two molecules which form due to the reaction must diffuse away from the carbon surface and do so with a partial volume rate of flow almost exactly double the partial volume rate of flow of the entering carbon dioxide or steam which must penetrate to the carbon surface before a reaction may take place. Such a mechanism cannot produce anything other than a sluggish reaction rate because the entering gases must penetrate against an adverse gaseous drift.

A small amount of sodium carbonate on the surface of the carbon overcomes the above-described inherently sluggish reaction rate. The sodium carbonate reacts with the carbon and produces sodium vapor at a pressure which is at least $10^{15}$ times as great as the normal vapor pressure of carbon at the same temperature. The active evolution of sodium vapor, in effect, converts the carbon into an easily vaporizable substance because sodium reacts freely with carbon dioxide or steam to reduce the same.

One preferable manner of operating according to this invention is to construct a gas producer shell in the usual manner and to provide it with a lining of refractory material which is passive to alkaline materials. A fire is started on the grate of the producer and maintained there by proper blasting. Fuel treated with sodium carbonate is then added until a fuel bed of the proper depth to accommodate zones 1 to 5, inclusive, figure 1, is obtained. The blasting of the producer and the admission of steam is then regulated to produce in the hottest part of the producer a temperature slightly below the normal softening temperature of the ash of the fuel. When this is done the producer will be operating at its maximum capacity and economical efficiency.

The fuel may be impregnated with sodium carbonate or sodium carbonate may be added at intervals mixed with only a portion of the fuel. The total amount of sodium carbonate will vary between a very small fraction of one per cent. and at times even 5 or 10 per cent. of the total amount of fuel used, but in operating in the preferred manner in which proper temperatures and depth of fuel bed are maintained the amount required is very small.

The thickness of fuel beds for producers operating according to this invention varies. If the producer be small, such as the type used for motor vehicles, the fuel bed may be two feet or less in thickness. A fuel bed only a few inches in depth has been successfully operated. If the producer be large, a thickness of about six feet is found suitable. There is, nevertheless, a depth of fuel bed which is most suitable for each type of producer embodying this invention. This depth will be controlled by the sizes and distribution of sizes of the fuel particles, the area of the grate, the temperature maintained, the cost of blasting, the cost of fuel, the cost of the equipment and the value of the gas produced. A fuel bed whose depth is properly adjusted to the above conditions will herein be referred to as a "deep" fuel bed.

This process may well be used in the ordinary gas producer as it is at present operated, but it may also be used with powdered solid fuel or with liquid fuel where solid carbon is formed as one step in the operation since the sodium compounds in suspension will attach themselves to the carbon particles and cause them to be more reactive. Thus sodium carbonate may be advantageously injected in the manufacture of oil gas or in water gas to remove the deposits of carbon which tend to accumulate in the set and to lessen the amount of undecomposed carbon which is carried in suspension out of the apparatus.

Throughout the specification where the words "sodium carbonate" have been used the term is meant to include closely related substances, such as the oxides, hydroxides and weak acid salts of sodium, potassium, rubidium, lithium and cæsium. All of these substances form a class which reacts with carbon above a dull red heat to yield a free alkali metal. The term "alkali metal compound" is used hereinafter in the claims to represent a member of this class.

While we have fully described our invention and have given specific examples thereof, we do not wish to be limited to a narrow construction of the same but wish only to be limited to the true scope of this invention as represented by the matter in the appended claims.

What we claim as our invention is:

1. The process of manufacturing fuel gas low in carbon dioxide from solid carbonaceous fuel in a gas generator which comprises mixing with a carbonaceous fuel less than ten per cent of its weight of a sodium compound which is capable of reacting with the fuel and evolving a continuous stream of the alkali metal vapor, forming said mixture into a fuel bed, igniting the mixture and blasting it with air and steam so that a reaction zone is formed and CO, $H_2$, $CO_2$ and a substantial amount of alkali metal vapor shall be evolved, said alkali metal vapor reacting with carbon dioxide and blast steam remaining undecomposed forming carbon monoxide, and hydrogen with the formation of solid sodium carbonate, filtering out said solid carbonate by its passage through the upper part of said fuel bed and returning said solid carbonate to the reaction zone as the fuel descends through the generator, removing gas as produced, and regularly adding fuel together with additional sodium compound to the extent necessary to replace unavoidable losses thereof.

2. The process of manufacturing fuel gas low in carbon dioxide from solid carbonaceous fuel in a gas generator which comprises mixing with a carbonaceous fuel less than ten per cent of its weight of a sodium compound which is capable of reacting with the fuel and evolving a continuous stream of the alkali metal vapor, forming said mixture into a fuel bed, igniting the mixture and blasting it with air so that a reaction zone is formed and CO, $CO_2$ and a substantial amount of alkali metal vapor shall be evolved, said alkali metal vapor reacting with carbon dioxide forming carbon monoxide with the formation of solid sodium carbonate, filtering out said solid carbonate by its passage through the upper part of said fuel bed and returning said solid carbonate to the reaction zone as the fuel descends through the generator, removing gas as produced, and regularly adding fuel together with additional sodium compound to the extent necessary to replace unavoidable losses thereof.

ALFRED H. WHITE.
DAVID A. FOX.